United States Patent
Chen Larsson et al.

(10) Patent No.: US 11,799,614 B2
(45) Date of Patent: Oct. 24, 2023

(54) SELECTION OF WAVEFORM FOR UPLINK COMMUNICATIONS

(71) Applicant: Telefonaktiebolaget LM Ericsson (publ), Stockholm (SE)

(72) Inventors: Daniel Chen Larsson, Lund (SE); Robert Baldemair, Solna (SE); Jung-Fu Cheng, Fremont, CA (US); Ravikiran Nory, San Jose, CA (US); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/533,803

(22) Filed: Nov. 23, 2021

(65) Prior Publication Data

US 2022/0085959 A1    Mar. 17, 2022

Related U.S. Application Data

(63) Continuation of application No. 16/610,765, filed as application No. PCT/SE2018/050467 on May 4, 2018, now Pat. No. 11,206,120.

(60) Provisional application No. 62/502,493, filed on May 5, 2017.

(51) Int. Cl.
*H04L 5/00* (2006.01)

(52) U.S. Cl.
CPC .......... *H04L 5/0091* (2013.01); *H04L 5/0007* (2013.01)

(58) Field of Classification Search
CPC .... H04L 5/0091; H04L 5/0007; H04L 5/0094
See application file for complete search history.

(56) References Cited

U.S. PATENT DOCUMENTS

| | | | | |
|---|---|---|---|---|
| 2008/0225693 | A1* | 9/2008 | Zhang | H04L 5/023 370/329 |
| 2010/0034152 | A1 | 2/2010 | Imamura | |
| 2018/0035423 | A1* | 2/2018 | Wang | H04L 1/0009 |
| 2018/0049173 | A1* | 2/2018 | Chen | H04L 5/0048 |
| 2019/0335537 | A1* | 10/2019 | Moroga | H04L 1/0003 |
| 2020/0252954 | A1* | 8/2020 | Kim | H04L 1/0061 |
| 2020/0396730 | A1* | 12/2020 | Kim | H04W 72/0413 |

FOREIGN PATENT DOCUMENTS

| | | |
|---|---|---|
| CN | 102119552 A | 7/2011 |
| CN | 106464428 A | 2/2017 |
| EP | 2557879 A1 | 2/2013 |
| WO | 2010030941 A2 | 3/2010 |
| WO | 2012029246 A1 | 3/2012 |

(Continued)

OTHER PUBLICATIONS

Chinese Office Action with English Summary Translation dated Dec. 3, 2021 for Patent Application No. 201880044844.2, consisting of 10-pages.

(Continued)

*Primary Examiner* — Robert C Scheibel
(74) *Attorney, Agent, or Firm* — Christopher & Weisberg, P.A.

(57) ABSTRACT

A method, network node and wireless device for waveform selection are provided. A method includes selecting a waveform based on one of a modulation and coding scheme, MCS, a resource allocation, and transport block size, TBS, and transmitting using the selected waveform.

16 Claims, 9 Drawing Sheets

(56) References Cited

FOREIGN PATENT DOCUMENTS

WO    2014088294 A1    6/2014
WO    2016130175 A1    8/2016

OTHER PUBLICATIONS

International Search Report and Written Opinion dated Oct. 5, 2018 issued in PCT Application No. PCT/SE2018/050467, consisting of 9 pages.
Considerations on waveform selection for new radio interface, GPP Draft; RI-162384, Apr. 2, 2016; 3rd Generation Partnership Project (3GPP), Mobile Competence Centre; consisting of 5 Pages.
Indian Office Action dated Jul. 23, 2021 for Patent Application No. 201947044788 consisting of 7-pages.
3GPP TSG-RAN WG1 #87 R1-1612075; Title: UL waveform configuration; Agenda Item: 7.1.4.2; Source: Qualcomm Incorporated; Document for: Discussion/Decision; Date and Location: Nov. 14-18, 2016, Reno, USA, consisting of 6-pages.

* cited by examiner

SELECTION OF WAVEFORM FOR UPLINK COMMUNICATIONS

CROSS-REFERENCE TO RELATED APPLICATIONS

This application is a Continuation of U.S. application Ser. No. 16/610,765, now U.S. Pat. No. 11,206,120, filed Nov. 4, 2019 entitled "SELECTION OF WAVEFORM FOR UPLINK COMMUNICATIONS", which is a U.S. National Stage Patent Application of International Application No.: PCT/SE2018/050467, filed May 4, 2018 entitled "SELECTION OF WAVEFORM FOR UPLINK COMMUNICATIONS," which claims priority to U.S. Provisional Application No. 62/502,493, filed May 5, 2017, entitled "SELECTION OF WAVEFORM FOR UL," the entireties of all of which are incorporated herein by reference.

FIELD

This disclosure relates to wireless communications, and in particular, to selection of a waveform for uplink communications in a wireless communication system.

BACKGROUND

The fifth generation (5G) of mobile telecommunications and wireless technology is not yet fully defined but in an advanced draft stage within third generation partnership project (3GPP). 5G wireless access will be realized by the evolution of Long Term Evolution (LTE) for existing spectrum in combination with new radio access technologies that primarily target new spectrum. Due to the scarcity of available spectrum, spectrum located in very high frequency ranges (compared to the frequencies that have so far been used for wireless communication), such as 10 GHz and above, are planned to be utilized for future mobile communication systems. Thus, evolving to 5G includes work on a New Radio (NR) Access Technology (RAT), also known as 5G or next generation (NX). The NR air interface targets spectrum in the range from sub-1 GHz (below 1 GHz) up to 100 GHz with initial deployments expected in frequency bands not utilized by LTE. Some LTE terminology is used in this disclosure in a forward looking sense, to include equivalent 5G entities or functionalities although a different term may be specified in 5G. A general description of the agreements on 5G New Radio (NR) Access Technology so far is contained in 3GPP TR 38.802 V14.0.0 (2017 March). Final specifications may be published inter alia in the future 3GPP TS 38.2** series.

Physical resources for RATs used in wireless communication, such as LTE and NR, networks may be scheduled in time and frequency in what could be seen as a time and frequency grid. For example, the basic downlink physical resource of the RAT LTE can be seen as a time-frequency grid that uses Orthogonal Frequency Division Multiplexing (OFDM) in the downlink (DL) and a pre-coded version of OFDM called Single Carrier Frequency Division Multiple Access (SC-FDMA) in the uplink (UL). LTE uses OFDM to transmit the data over many narrow band carriers, usually of 180 KHz each, instead of spreading one signal over the complete 5 MHz carrier bandwidth, in other words OFDM uses a large number of narrow sub-carriers for multi-carrier transmission to carry data. The OFDM symbols are grouped into so called physical resource blocks (PRB) or just resource blocks (RB). The basic unit of transmission in LTE is a RB, which in its most common configuration consists of 12 subcarriers and 7 OFDM symbols (one slot). In LTE the resource blocks have a total size of 180 kHz in the frequency domain and 0.5 ms (one slot) in the time domain. Each element in the time-frequency grid containing one symbol and one subcarrier is referred to as a resource element (RE). Each 1 ms Transmission Time Interval (TTI) consists of two slots (Tslot), usually represented by 14 OFDM symbols. LTE downlink transmissions are organized into radio frames of 10 ms, each radio frame consisting of ten equally-sized subframes of length Tsubframe=1 ms. The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

The new RAT NR will use a similar structure for the physical resources as LTE, using multiple carriers in frequency and symbols in the time domain, defining resource elements of physical resource blocks. The physical resource parameters may vary in NR. For example, the carriers may span a variable frequency range, the frequency spacing or density between the carriers may vary, as well as the cyclic prefix (CP) used. The frequency spacing between subcarriers can be seen as the frequency bandwidth between the center of a subcarrier and the adjacent subcarrier, or the bandwidth occupied by each subcarrier in the frequency band.

The support of multiple numerologies has been agreed for NR. A numerology defines basic physical layer parameters, such as subframe structure and may include transmission bandwidth, subframe duration, frame duration, slot duration, symbol duration, subcarrier spacing, sampling frequency, number of subcarrier, RB per subframe, symbols per subframe, CP length etc. In LTE the term numerology includes, e.g., the following elements: frame duration, subframe or TTI duration, slot duration, subcarrier spacing, cyclic prefix length, number of subcarriers per RB, number of RBs within the bandwidth (different numerologies may result in different numbers of RBs within the same bandwidth). In LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers.

The multiple numerologies in NR can be multiplexed in the frequency and/or time domain for the same or different WDs. Different numerologies may thus coexist on the same subcarrier. In NR, which is to be based on OFDM, the multiple numerologies will be supported for general operation. A scaling approach (based on a scaling factor $2^n$, $n \in N\_0$) is considered for deriving subcarrier spacing candidates for NR. Values for subcarrier bandwidths currently discussed include among others 3.75 kHz, 15 kHz, 30 kHz, 60 kHz. The numerology-specific slot durations can then be determined in ms based on the subcarrier spacing: subcarrier spacing of $(2^m*15)$ kHz, m being an integer, gives exactly ½m 0.5 ms for a slot that is 0.5 ms in the 15 kHz numerology.

Subcarrier spacings of at least up to 480 kHz are currently being discussed for NR (the highest discussed values correspond to millimeter-wave based technologies). It has also been agreed that multiplexing different numerologies within a same NR carrier bandwidth is supported, and frequency division multiplexing (FDM) and/or time division multiplexing (TDM) can be considered. It has further been agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies. In NR the transmission bandwidth of a single carrier transmitted by a network node (also known as gNB) may be larger than the WD bandwidth capability, or the configured receiver bandwidth of a connected device (such as WD). Each network node may also transmit using different numerologies which are time division multiplexed (TDM) or frequency division multiplexed (FDM).

It has been proposed that the duration of the subframes in NR should always have a duration of 1 ms, and that the transmission could be flexibly defined by using slots, the slots being proposed to contain 14 or 7 time symbols (symbols of a defined time duration), such as OFDM (DFTS-OFDM, Discrete Fourier Transform Spread OFDMA) or SC-FDMA. The use of so called "mini-slots" have also been proposed which could have a variable length (any duration of symbols) and start position, thus they could be located anywhere in the slots.

NR defines different slot formats or slot configurations, a slot can be 7 or 14 symbols which is also referred to as a slot interval, a slot duration can be a pure UL slot or it can have a DL control region, a slot duration can accommodate differently long guard periods between duplex directions, multiple slots can be aggregated, numerologies with extended cyclic prefix result in fewer symbols per slot. A "slot" could also refer to the length in symbols of a transmission.

Short PUCCH and Long PUCCH have been proposed in NR. A Short PUCCH (sPUCCH) is typically 1 or 2 symbols long and is often placed in the end of a slot interval in second last or last symbol but may also be distributed over a slot interval, and a Long PUCCH is 4 symbols long or more (4-14 symbols) and it can be extended or repeated to extend over several slots.

Transmissions in radio communication systems are often organized in terms of frames (or sometimes subframes), where each frame is a group of transmission resources (e.g., radio time and frequency resources) that contains both of at least one control field and at least one payload data field. Typically the control field appears in the beginning of the frame and contains, e.g., information about how the data part of the frame is encoded and modulated. The control field may also contain information related to data transmission in the reverse link direction (i.e. data transmitted from the receiver of the control information), e.g., acknowledgment/non-acknowledgement (ACK/NACK) reports or channel state information (CSI).

If a communication system does not use a paired spectrum (different frequency bands for the two link directions), as millimeter-wave (mmW) systems typically will not do, it is normally necessary to limit communication to half-duplex, i.e., transmission can at any one time instance occur only in one of the two link directions. Hence, time-division duplex (TDD) has to be used. One reason for this limitation is that a network node, e.g., an access node (AN) or a user equipment/mobile/wireless device (WD) that is transmitting, saturates its own analog receiving circuitry due to strong overhearing between transmit and receive antennas. In half-duplex systems, it may be useful to have two fields for control information in every frame, one for one link direction, and one for the other. The two directions of a link will henceforth be referred to as Tx/Rx directions, or sometimes the two duplex directions. In other words, any given node uses one of the fields for transmission (Tx) and the other field for reception (Rx).

In precoded multi-carrier signaling, a multi-carrier modulator, such as for example orthogonal frequency division multiplex or filter bank multi-carrier (FBMC) modulation, is not directly fed with data in the frequency domain but rather, data is first precoded and then applied to the subcarriers of the multi-carrier modulator. This is illustrated in FIG. 1.

The precoding transformation can be any precoder transformation that enables a certain desired property at the output of the multi-carrier modulator. Very often the precoding is used to generate a low Peak-to-Average Power Ratio (PAPR) signal at the output of the multi-carrier modulator. If the multi-carrier modulator is an OFDM modulator a common choice of the precoder is the Discrete Fourier Transform (DFT). In such case, the precoded multi-carrier scheme is the well-known discrete Fourier Transform spread (DFTS)-OFDM signaling scheme as in LTE uplink.

If the multi-carrier modulator is FBMC, a choice that reduces PAPR at the output of the FBMC modulator is to perform precoding with a filter bank transformation.

In case of DFTS-OFDM the output signal for block i can be written as (omitting the subscript i for simplicity)

$$y = F_N^H S F_M x,$$

with $F_M$ and $F_N$ the DFT matrices of size M and N, respectively. M is the number of allocated subcarrier and N is the IDFT size of the OFDM modulator. The N×M matrix S maps the output of the spreading operations to the M allocated subcarriers and has exactly one 1 and otherwise only 0 in each column. For a contiguous mapping of the M subcarriers we have $$S = \begin{bmatrix} 0_{L_{0_1}} \\ I_M \\ 0_{L_{0_2}} \end{bmatrix},$$

with the M×M identity matrix $I_M$ and $$0_{L_{0_1}} \text{ and } 0_{L_{0_2}}$$

are zero matrices of size $L_{0_1} \times M$ and $L_{0_2} \times M$, respectively. Non-contiguous mappings such as interleaved mapping are possible as well. The data vector to transmit is the M element vector x.

Typically a guard interval is prefixed to y to enable simple frequency-domain equalization at the receiver. The guard interval can either be a true guard interval (an L-element long zero vector) or a cyclic prefix (copy of the last L elements of y), as shown in FIGS. 2A and 2B. In both cases, the signal with guard interval can be written as $$\tilde{y} = Py = P F_N^H S F_M x,$$

with P the matrix inserting the true guard interval or cyclic prefix.

A possible frame structure of a communication system is illustrated in FIG. 3. Any two nodes communicating may in principle arbitrarily select which of the two control fields should be used for Tx and which for Rx. However, such arbitrariness may require complicated negotiation procedures and hence it is often more practical to have a general rule for the system, e.g., that one of the fields is always used for DL Tx, i.e., Tx by ANs, whereas the other field is always used for UL Tx, i.e., Tx by wireless devices, as shown in FIG. 4. Note also that frames on different links in the system should preferably be time-aligned, partly because this enables nodes to more freely and efficiently change communication partner (node) from one frame to another, without waiting for the other communication link to finish its frame.

Fields are in most transmission systems further divided into smaller units, e.g., in OFDM-based systems, the fields would be further divided into one or more OFDM symbols. Similar holds, e.g., for systems based on DFTS-OFDM, FBMC, etc. Some fields may consist of only a single symbol.

It should be noted that within each of the three fields, there may typically also be other signals interspersed, e.g., reference signals or pilot signals to allow the receiver to perform channel estimation.

For an initial transmission of a long term evolution (LTE) physical uplink shared channel (PUSCH), a modulation and coding scheme (MCS) index, $I_{MCS}$, is signalled in the DCI to the WD. The WD uses the received $I_{MCS}$ as the row key to read off modulation order, $Q_m$, and transport block size (TBS) index, $I_{TBS}$, from an MCS table specified in TS 36.213. To determine the TBS, the WD first calculates the total number of allocated physical resource blocks (PRBs), $N_{PRB}$. The WD then determines the TBS from a TBS table specified in TS 36.213 using $I_{TBS}$ as row key and $N_{PRB}$ as column key.

In case of retransmission, the evolved nodeB (eNB) (base station) can elect to signal a modulation order to the WD and the WD shall assume the TBS determined from downlink control information (DCI) transported in the latest physical downlink control channel (PDCCH) for the same transport block using $0 \leq I_{MCS} \leq 27$ or 28.

The PUSCH TBSs are designed assuming 144 resource elements (REs) per PRB are available for carrying the PUSCH. The MCS table is designed assuming DFTS-OFDM waveform for PUSCH.

The Rel-8 LTE PUSCH was designed to operate a synchronous hybrid automatic repeat request (HARQ) protocol. For initial transmissions, the redundancy version is restricted to $rv_{idx}=0$.

For $0 \leq I_{MCS} \leq 27$, the WD determines the TBS based on, for example, $$TBS = 8 \times \left\lceil \frac{N_{PRB} \cdot N_{RE}^{DL,PRB} \cdot v \cdot Q_m \cdot R}{8} \right\rceil$$

where
 v is number of layers the codeword is mapped onto
 $N_{RE}^{DL,PRB}$ is the number of REs per slot/mini-slot available for carrying the PUSCH.

For $28 \leq I_{MCS} \leq 31$, the TBS is assumed to be determined from the DCI in the most recently received PDCCH for the same TB using $0 \leq I_{MCS} \leq 27$.

As discussed above, $N_{RE}^{DL,PRB}$ is assumed to be 144 in LTE. For NR to support various slot/mini-slot/PUSCH lengths, a more flexible framework for $N_{RE}^{DL,PRB}$ is to be used. One or more of the following components can be considered:

A default $N_{RE}^{DL,PRB}$ value may be defined in NR specifications and can be applicable to, e.g., system information, paging and random access reply transmissions. For this purpose, $N_{RE}^{DL,PRB}=144$ can be considered for 14-OS slot and $N_{RE}^{DL,PRB}=72$ can be considered for 7-OS slot.

Some default $N_{RE}^{DL,PRB}$ values for different PUSCH transmission lengths can be specified in the specification.

The network can configure the WD to apply a specific $N_{RE}^{DL,PRB}$ to the PUSCH.

The network can configure a set of $N_{RE}^{DL,PRB}$ values (e.g., four values) to the WD. The DCI then contains an index to instruct the WD to apply one of the pre-configured $N_{RE}^{DL,PRB}$ value for the current PUSCH.

If code rates lower than those available in the MCS table are found to be necessary for a specific use case (e.g., ultra-reliable low latency communication (URLLC)), the network can configure/select a $N_{RE}^{DL,PRB}$ value that is substantially lower such that the allocated resources are used to carry a substantially smaller transport block (TB).

NR supports two waveforms at least in the uplink (UL). One is OFDM and the other one is DFTS-OFDM. To have an efficient method to switch between the waveforms would not be possible through radio resource control (RRC) signaling as this would require quite a long reconfiguration time. During the time of reconfiguration, the WD may go out of coverage for OFDM and before DFTS-OFDM has been applied. In the other direction, the WD may suffer throughput losses as DFTS-OFDM does not support multiple layers and may not support higher order modulations with equal efficiency. There is also a period of uncertainty in conjunction with RRC signaling where the waveform the WD will use in the UL is not known to the network. In LTE, this uncertainty period from the standard is 15 ms and, in addition, there may be some implementation based uncertainty from the network side.

SUMMARY

Some embodiments advantageously provide a method and system to provide compatible conversion methods achieved by selecting a waveform based on an MCS table. This enables a resource efficient method of changing the waveform between OFDM and DFTSS-OFDM modulations.

A method, network node and wireless device for waveform selection are provided. A method includes selecting a waveform based on one of a modulation and coding scheme, MCS, a resource allocation, and transport block size, TBS, and transmitting using the selected waveform.

According to one aspect, a wireless device configured for waveform selection is provided. The wireless device includes a receiver configured to receive a first indication of a first selected waveform from a network node. The wireless device further includes a transmitter configured to transmit using the first selected waveform.

In some embodiments, the first selected waveform is selected from a plurality of possible waveforms. In some embodiments, the receiver further receives a second indication of a second selected waveform, different from the first selected waveform, from the network node, the second selected waveform to be transmitted by the wireless device to the network node. In some embodiments, the first selected waveform is one of an orthogonal frequency division multiplex, OFDM, waveform, a discrete Fourier transform spread-OFDM, DFTS-OFDM waveform and a single carrier modulation waveform. In some embodiments, the second selected waveform is one of an orthogonal frequency division multiplex, OFDM, waveform, a discrete Fourier transform spread-OFDM, DFTS-OFDM waveform and a single carrier modulation waveform. In some embodiments, the second indication of the second selected waveform is received on a downlink control channel and the second selected waveform is transmitted on an uplink shared channel. In some embodiments, the first indication of the first selected waveform is received on a downlink control channel and the first selected waveform is transmitted on an uplink shared channel. In some embodiments, the first indication of the first selected waveform indicates a modulation and coding scheme for the first selected waveform. In some embodiments, selecting the first selected waveform includes choosing an index and a modulation and coding scheme, MCS, from a table. In some embodiments, the first indication of the first selected waveform indicates a resource allocation for the first selected waveform. In some embodiments, waveform selection is based on resource allocation of data. In some embodiments, when consecutive resources are integer multiples of 2, 3 and 5, then a selected waveform is discrete Fourier transform orthogonal frequency division multiplex, DFTS-OFDM, and is OFDM otherwise. In some embodiments, selecting the waveform includes choosing an index and a resource allocation from a table. In some embodiments, the first indication of the first selected waveform indicates a transport block size, TBS, for the first selected waveform. In some embodiments, the first selected waveform is selected together with TBS so that if the TBS is smaller than a threshold, the first selected waveform is discrete Fourier transform orthogonal frequency division multiplex, DFTS-OFDM, and is OFDM otherwise.

According to another aspect, a method in a wireless device for waveform selection is provided. The method includes receiving a first indication of a first selected waveform from a network node; and transmitting using the first selected waveform.

According to another aspect, a network node configured for waveform selection is provided. The network node includes a waveform selector configured to select at least a first selected waveform for a wireless device to use for transmissions. The network node further includes a transmitter configured to transmit a first indication of the first selected waveform to inform the wireless device of the selected first selected waveform.

In some embodiments, the first selected waveform is selected from a plurality of possible waveforms. In some embodiments, the waveform selector is further configured to select a second selected waveform to use for transmissions to the wireless device on a downlink. In some embodiments, the first selected waveform is one of an orthogonal frequency division multiplex, OFDM, waveform, a discrete Fourier transform spread-OFDM, DFTS-OFDM waveform and a single carrier modulation waveform. In some embodiments, the second selected waveform is one of an orthogonal frequency division multiplex, OFDM, waveform, a discrete Fourier transform spread-OFDM, DFTS-OFDM waveform and a single carrier modulation waveform. In some embodiments, the transmitter is further configured to transmit a second indication of the second selected waveform to inform the wireless device of the second selected waveform. In some embodiments, the second indication of the second selected waveform is transmitted on a downlink control channel and the second selected waveform is transmitted on a downlink shared channel. In some embodiments, the first indication of the first selected waveform is transmitted on a downlink control channel and the first selected waveform is transmitted on an uplink shared channel. In some embodiments, the first indication of the first selected waveform indicates a modulation and coding scheme for the first selected waveform. In some embodiments, selecting the first selected waveform includes choosing an index and a modulation and coding scheme, MCS, from a table. In some embodiments, the first indication of the first selected waveform indicates a resource allocation for the first selected waveform. In some embodiments, waveform selection is based on resource allocation of data. In some embodiments, when consecutive resources are integer multiples of 2, 3 and 5, then a selected waveform is discrete Fourier transform orthogonal frequency division multiplex, DFTS-OFDM, and is OFDM otherwise. In some embodiments, selecting the waveform includes choosing an index and a resource allocation from a table. In some embodiments, the first indication of the first selected waveform indicates a transport block size, TBS, for the first selected waveform. In some embodiments, the first selected waveform is selected together with TBS so that if the TBS is smaller than a threshold, the first selected waveform is discrete Fourier transform orthogonal frequency division multiplex, DFTS-OFDM, and is OFDM otherwise.

According to yet another aspect, a method in a network node for waveform selection is provided. The method includes selecting at least a first waveform by for a wireless device to use for transmissions. The method further includes transmitting a first indication of the first selected waveform to inform the wireless device of the first selected waveform.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
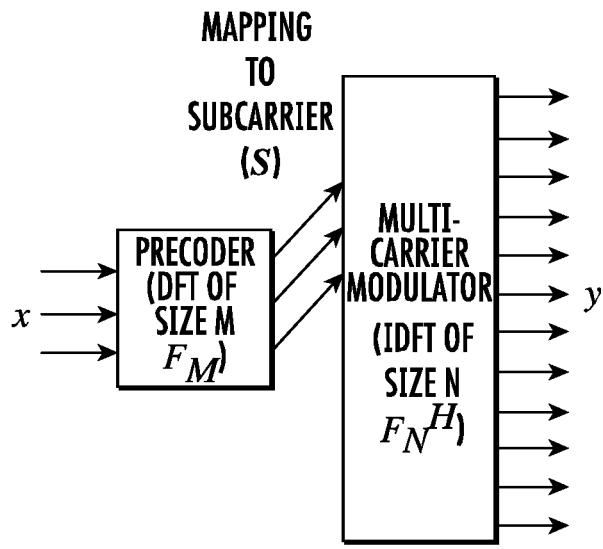
FIG. 1 is a block diagram illustrating precoding followed by modulation.
Figure 2A:
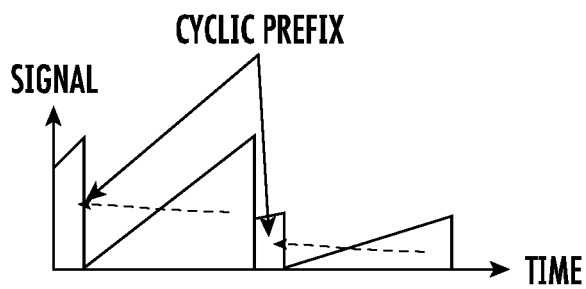
FIGS. 2A and 2B are timing diagrams showing a guard interval.
Figure 2B:
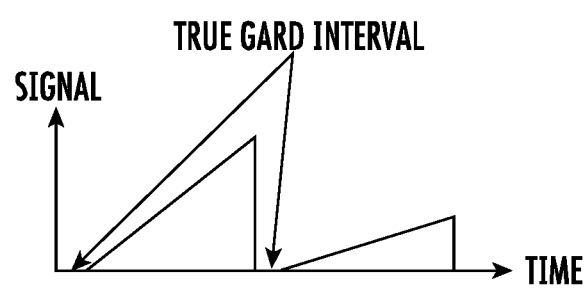
Figure 3:
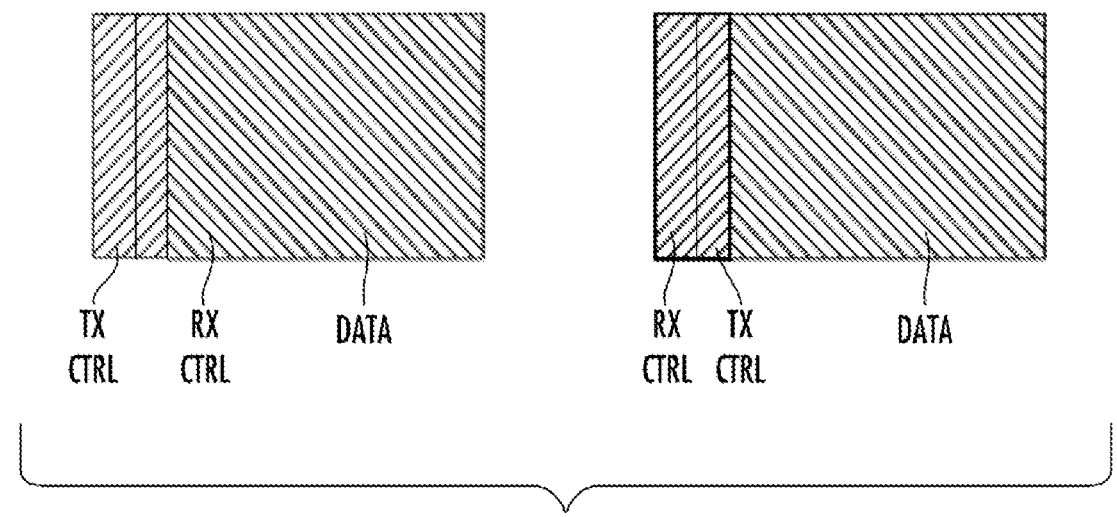
FIG. 3 is a diagram of a possible frame structure of a communication system.
Figure 4:
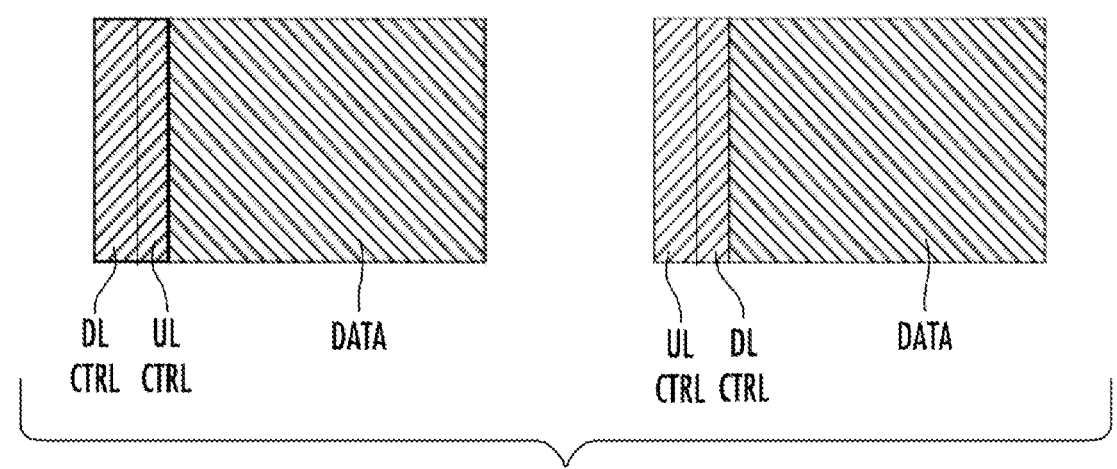
FIG. 4 is a diagram of a possible frame structure of a communication system.

Before describing in detail exemplary embodiments, it is noted that the embodiments reside primarily in combinations of apparatus components and processing steps related to selection of a waveform for uplink communications in a wireless communication system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein are focused on selection between DFTS-OFDM and OFDM based waveforms in UL for NR. However, the same principles can be applied for physical downlink shared channel (PDSCH) for downlink (DL), and can further be applied for more than selecting between these two waveforms. The selection may be increased to include three, four or more waveforms as well. Selection could further be between OFDM and some other type of waveform as well.

Figure 5:
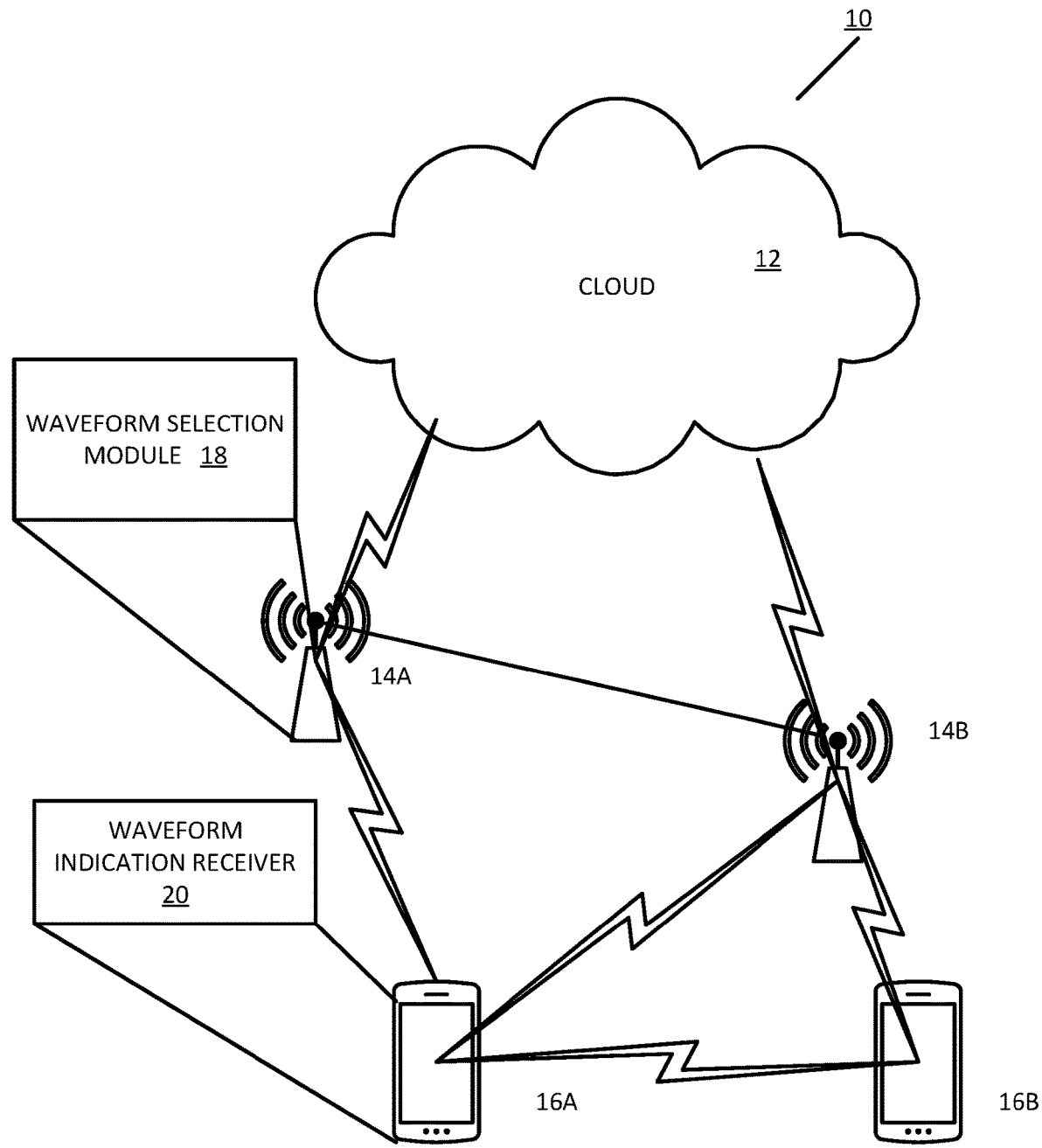
FIG. 5 is a block diagram of a wireless communication system 10 constructed according to principles set forth herein.

Returning to the drawing figures, in which like elements are referred to by like reference numerals, there is shown in FIG. 5 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein.

As shown in FIG. 5, the network node 14 includes a waveform selection module 18 configured to select a waveform based on one of a modulation and coding scheme, MCS, a resource allocation, and transport block size, TBS. The wireless device 16 includes a waveform indication receiver 20 configured to receive an indication of a selected waveform from a network node 14.

Figure 6:
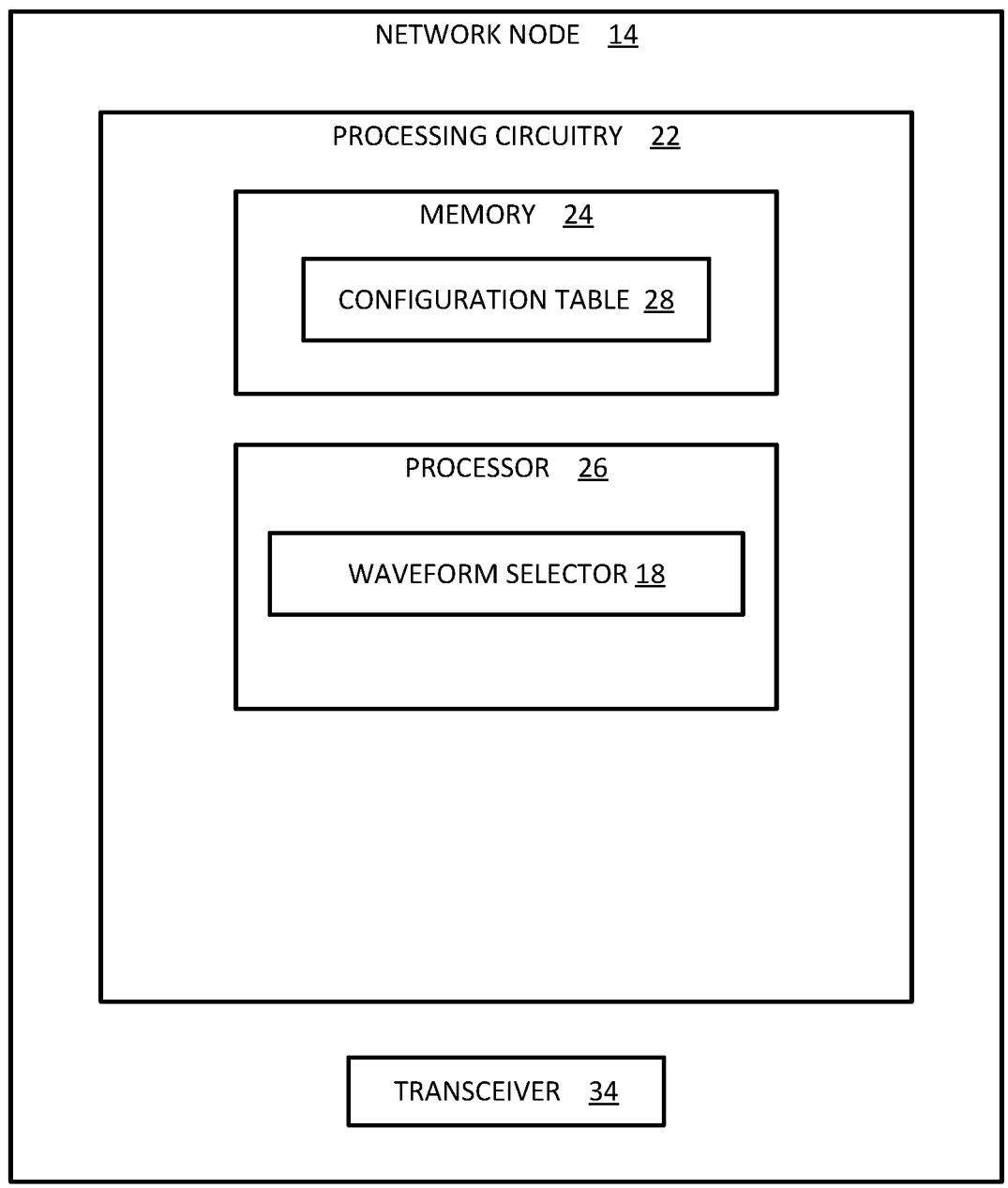
FIG. 6 is a block diagram of the network node constructed according to principles set forth herein.

FIG. 6 is a block diagram of an example network node 14. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store a configuration table 28 that associates an index with a parameter such as an MCS, a resource allocation and a TBS. The waveform selection module is configured to select a waveform based on one of a modulation and coding scheme, MCS, a resource allocation, and transport block size, TBS. The transceiver 34 is configured to transmit using the selected waveform.

Figure 7:
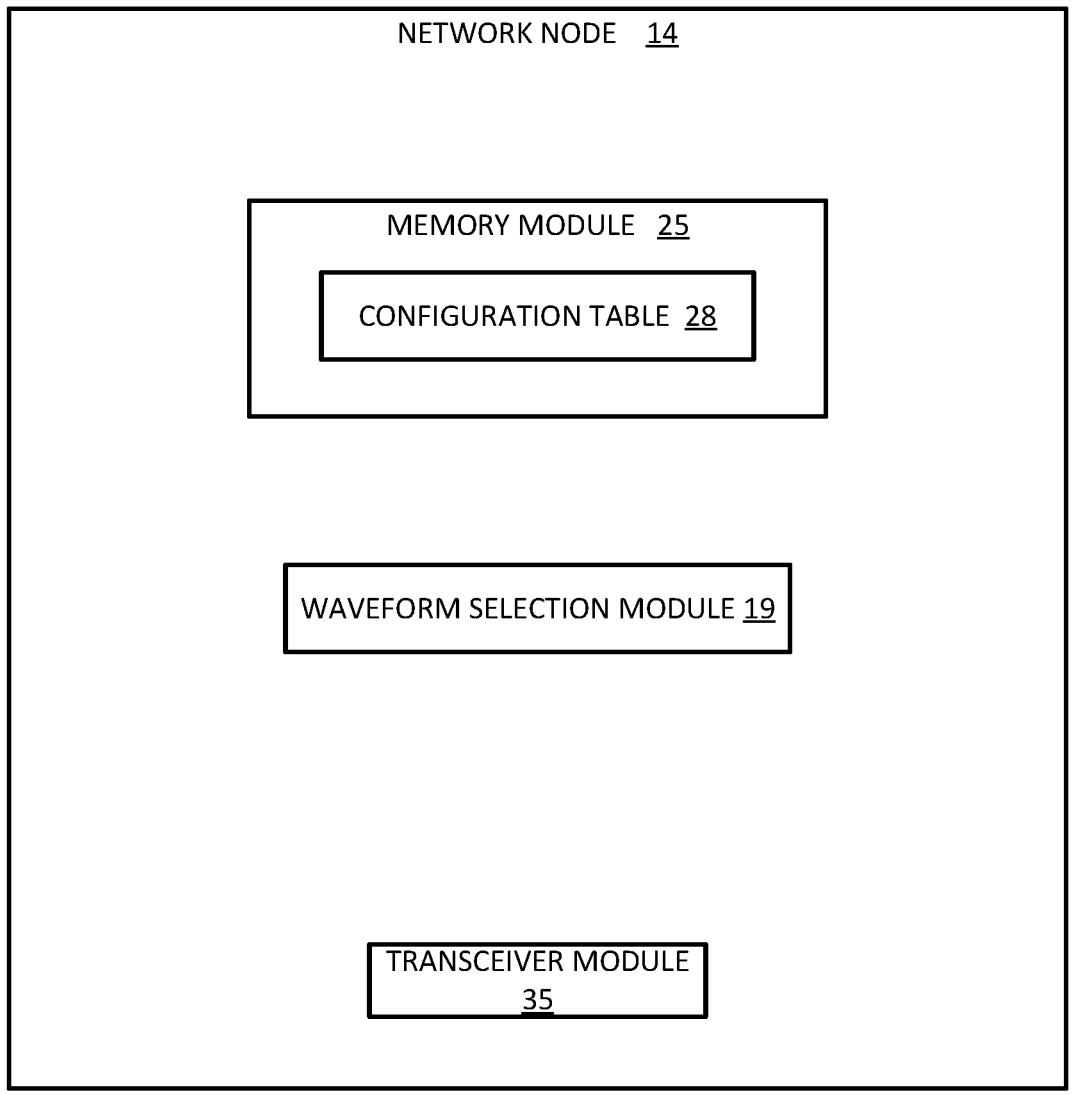
FIG. 7 is a block diagram of an alternative embodiment of the network node.

FIG. 7 is a block diagram of an alternative embodiment of the network node 14. The memory module 25 stores the configuration table 28. A waveform selection module 19 may be implemented as a software module configured to select a waveform based on one of a modulation and coding scheme, MCS, a resource allocation, and transport block size, TBS. The transceiver module 35 is configured to transmit using the selected waveform.

Figure 8:
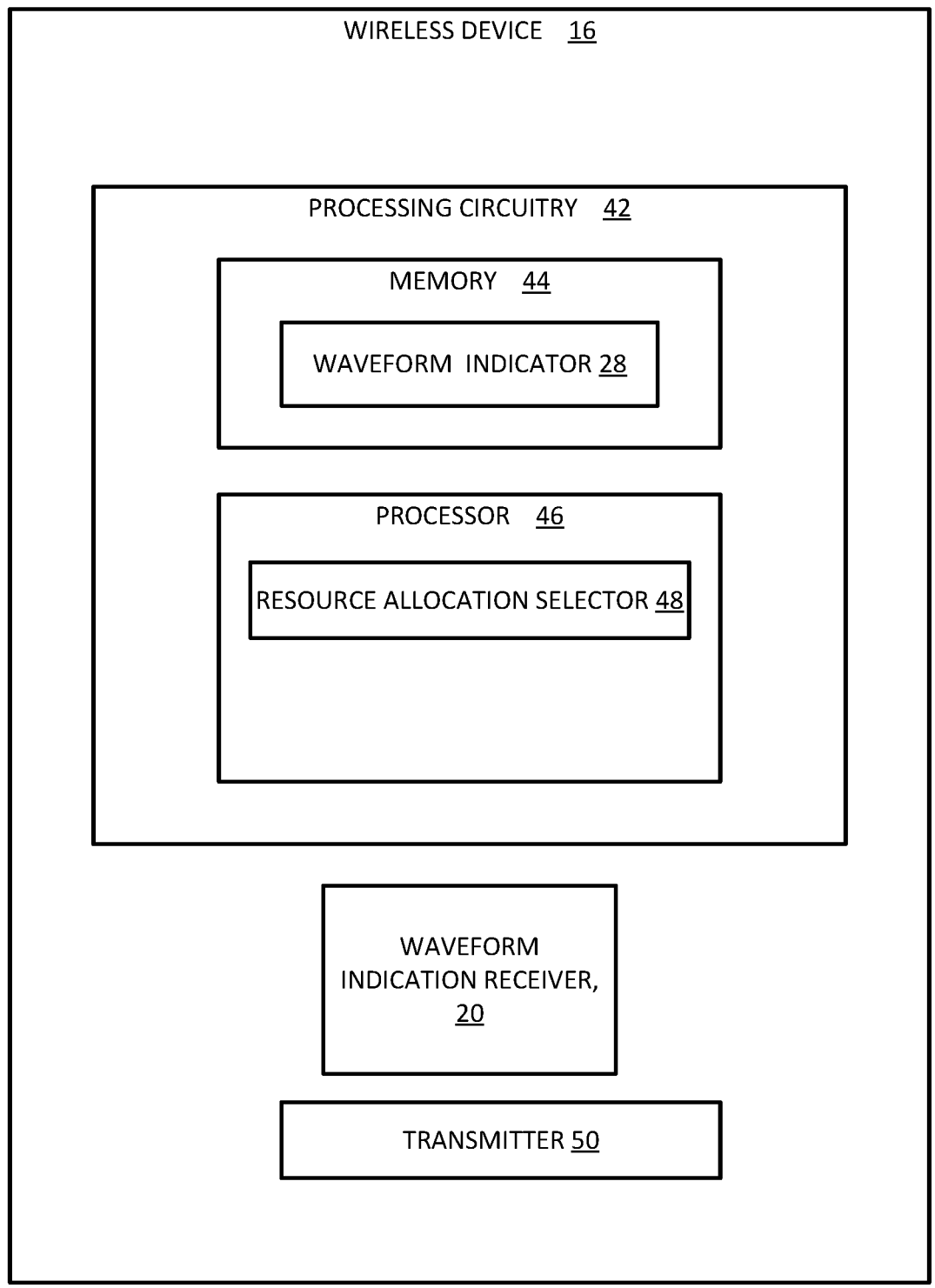
FIG. 8 is a block diagram of a wireless device constructed in accordance with principles set forth herein.

FIG. 8 is a block diagram of a wireless device 16 constructed in accordance with principles set forth herein. The wireless device 16 includes processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store a waveform indicator 28 received from the network node 14. The resource allocation selector 48 is configured to select a resource allocation based on the waveform indicator 28. The waveform indication receiver 20 is configured to receive an indication of a selected waveform from a network node 14. The transmitter 50 is configured to transmit using the selected waveform.

Figure 9:
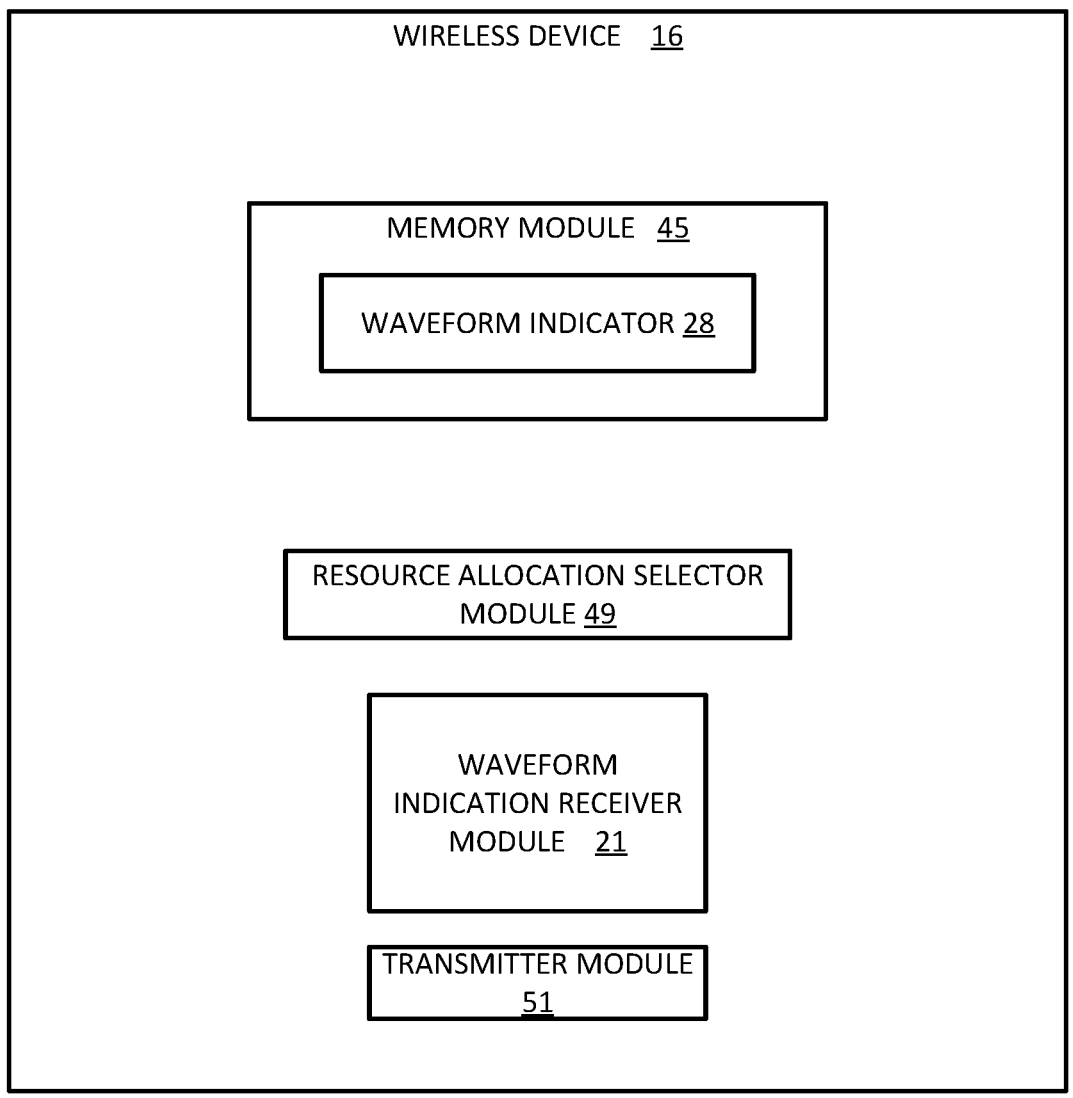
FIG. 9 is a block diagram of an alternative embodiment of a wireless device.

FIG. 9 is a block diagram of an alternative embodiment of a wireless device 16. The memory module 45 stores the waveform indication 28. The resource allocation selector module 49 may be software configured to select a resource allocation based on the waveform indicator 28. The waveform indication receiver module 21 is configured to receive an indication of a selected waveform from a network node 14. The transmitter module 51 is configured to transmit using the selected waveform.

Figure 10:
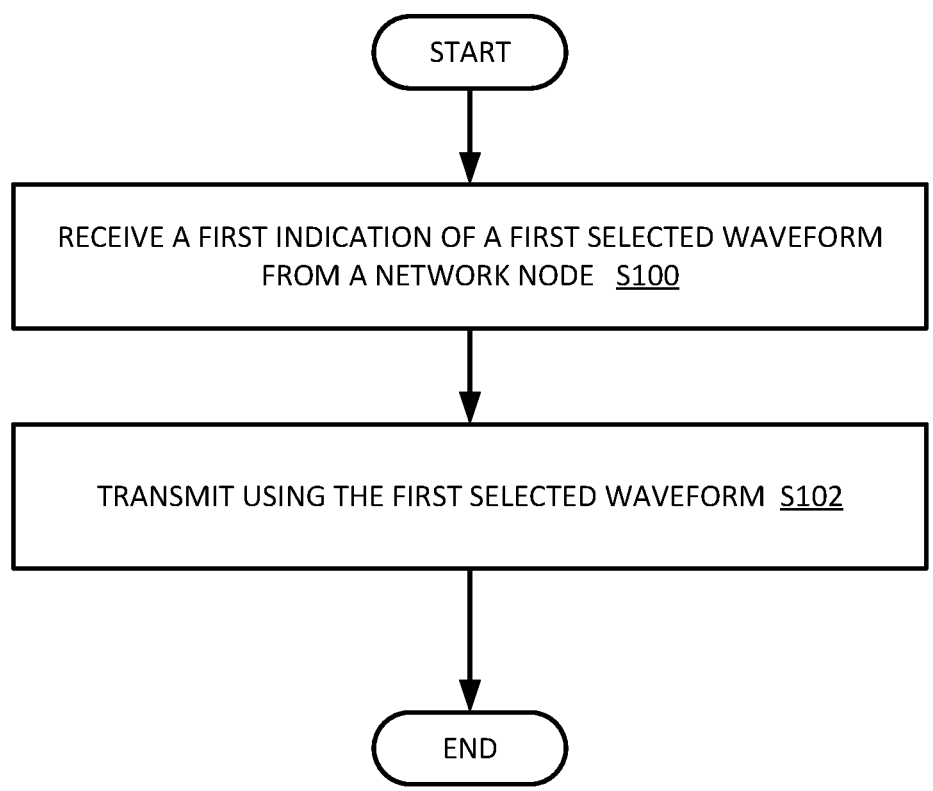
FIG. 10 is a flowchart of an exemplary process in a network node for uplink waveform selection.

FIG. 10 is a flowchart of an exemplary process in a network node 14 for uplink waveform selection. The process includes selecting, via the waveform selection module 18, a waveform based on one of a modulation and coding scheme, MCS, a resource allocation, and transport block size, TBS (block S100). The process also includes transmitting, via the receiver 34, using the selected waveform (block S102).

Figure 11:
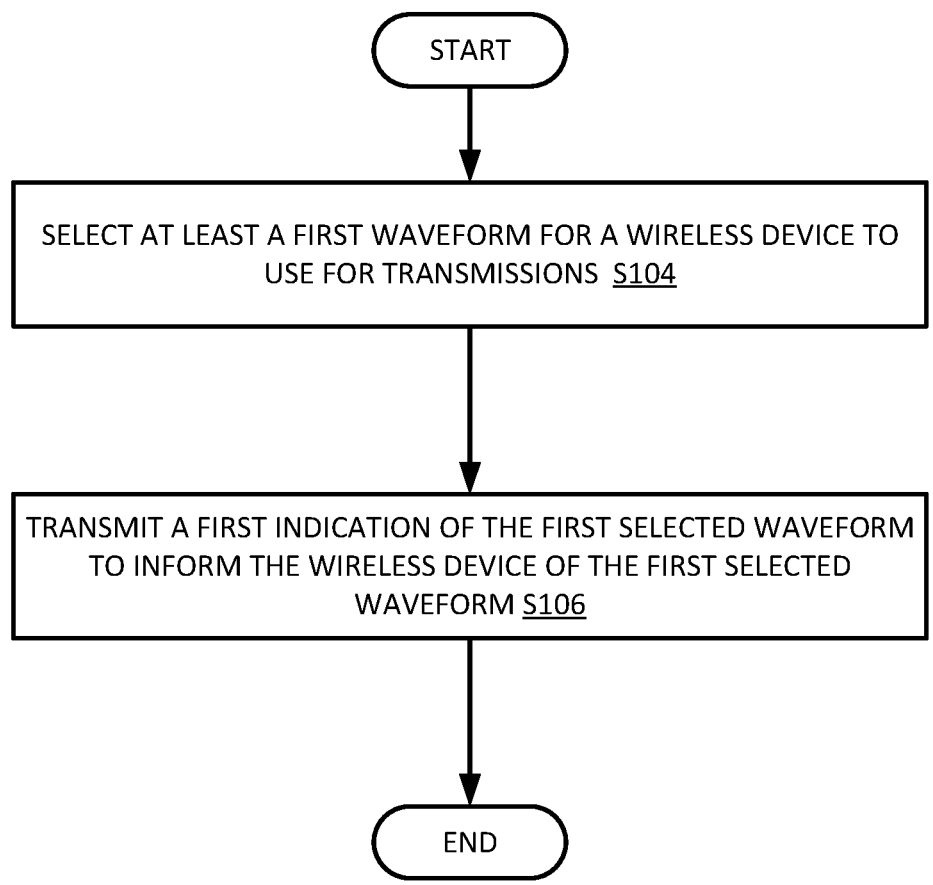
FIG. 11 is a flowchart of an exemplary process in a wireless device for using a waveform selection.

FIG. 11 is a flowchart of an exemplary process in a wireless device 16 for using a waveform selection. The process includes receiving, via the waveform indication receiver 20, an indication of a selected waveform from a network node 14 (block S104), and transmitting, via the transmitter 50, using the selected waveform S106.

Further details relating to the disclosure and embodiments described above relating to waveform selection and resource allocation are provided below.

For new radio (NR) PUSCH, the MCS table may provide modulation order, $Q_m$, and target code rate, R, instead of the TBS index $I_{TBS}$. One such example for PUSCH with OFDM waveform is provided in Table 1. The target code rates are those agreed for LTE MCS table for 256QAM support.

TABLE 1

Example MCS Table for NR PUSCH with OFDM Waveform

| MCS Index $I_{MCS}$ | Modulation order $Q_m$ | Code Rate R × 1024 |
|---|---|---|
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 682.5 |
| 21 | 8 | 711 |
| 22 | 8 | 754 |
| 23 | 8 | 797 |
| 24 | 8 | 841 |
| 25 | 8 | 885 |
| 26 | 8 | 916.5 |
| 27 | 8 | 948 |
| 28 | 2 | reserved |
| 29 | 4 | |
| 30 | 6 | |
| 31 | 8 | |

In a first embodiment, the selection of the waveform is embedded in the modulation and coding scheme (MCS) table so that specific entries in the MCS table indicates a given waveform. The waveform in this example can be either DFTS-OFDM or OFDM. A solution for this is given as an example in Table 2.

TABLE 2

Example of Waveform Selection Using MCS Table

| MCS Index $I_{MCS}$ | Modulation order $Q_m$ | Code Rate R × 1024 | Waveform |
|---|---|---|---|
| 0 | 2 | 120 | OFDM |
| 1 | 2 | 193 | OFDM |
| 2 | 2 | 308 | OFDM |
| 3 | 2 | 449 | OFDM |
| 4 | 2 | 602 | OFDM |
| 5 | 4 | 378 | OFDM |
| 6 | 4 | 434 | OFDM |
| 7 | 4 | 490 | OFDM |
| 8 | 4 | 553 | OFDM |
| 9 | 4 | 616 | OFDM |
| 10 | 4 | 658 | OFDM |

TABLE 2-continued

Example of Waveform Selection Using MCS Table

| MCS Index $I_{MCS}$ | Modulation order $Q_m$ | Code Rate R × 1024 | Waveform |
|---|---|---|---|
| 11 | 6 | 466 | OFDM |
| 12 | 6 | 517 | OFDM |
| 13 | 6 | 567 | OFDM |
| 14 | 6 | 616 | OFDM |
| 15 | 6 | 666 | OFDM |
| 16 | 6 | 719 | OFDM |
| 17 | 6 | 772 | OFDM |
| 18 | 6 | 822 | OFDM |
| 19 | 6 | 873 | OFDM |
| 20 | 8 | 682.5 | OFDM |
| 21 | 8 | 711 | OFDM |
| 22 | 8 | 754 | OFDM |
| 23 | 8 | 797 | OFDM |
| 24 | 8 | 841 | OFDM |
| 25 | 8 | 885 | OFDM |
| 26 | 8 | 916.5 | OFDM |
| 27 | 8 | 948 | OFDM |
| 28 | 2 | 120 | DFTS-OFDM |
| 29 | 2 | 193 | DFTS-OFDM |
| 30 | 2 | 308 | DFTS-OFDM |
| 31 | 2 | 449 | DFTS-OFDM |
| 32 | 2 | 602 | DFTS-OFDM |
| 33 | 4 | 378 | DFTS-OFDM |
| 34 | 4 | 434 | DFTS-OFDM |
| 35 | 4 | 490 | DFTS-OFDM |
| 36 | 4 | 553 | DFTS-OFDM |
| 37 | 4 | 616 | DFTS-OFDM |
| 38 | 4 | 658 | DFTS-OFDM |
| 39 | 6 | 466 | DFTS-OFDM |
| 40 | 6 | 517 | DFTS-OFDM |
| 41 | 6 | 567 | DFTS-OFDM |
| 42 | 6 | 616 | DFTS-OFDM |
| 43 | 6 | 666 | DFTS-OFDM |
| 44 | 6 | 719 | DFTS-OFDM |
| 45 | 6 | 772 | DFTS-OFDM |
| 46 | 6 | 822 | DFTS-OFDM |
| 47 | 6 | 873 | DFTS-OFDM |
| 48 | 8 | 682.5 | DFTS-OFDM |
| 49 | 8 | 711 | DFTS-OFDM |
| 50 | 8 | 754 | DFTS-OFDM |
| 51 | 8 | 797 | DFTS-OFDM |
| 52 | 8 | 841 | DFTS-OFDM |
| 53 | 8 | 885 | DFTS-OFDM |
| 54 | 8 | 916.5 | DFTS-OFDM |
| 55 | 8 | 948 | DFTS-OFDM |
| 56 | 2 | reserved | DFTS-OFDM |
| 57 | 4 |  | DFTS-OFDM |
| 58 | 6 |  | DFTS-OFDM |
| 59 | 8 |  | DFTS-OFDM |
| 60 | 2 |  | OFDM |
| 61 | 4 |  | OFDM |
| 62 | 6 |  | OFDM |
| 63 | 8 |  | OFDM |

More entries may be allowed for OFDM based modulation than for DFTS-OFDM based modulation in some embodiments. In some embodiments, either of the waveforms may be limited in modulation orders in some respect. For example, DFTS-OFDM is only operated for up to 64 quadrature amplitude modulation (QAM) as an example. As a further example, the OFDM waveform does not operate with BPSK or π/2 BPSK. The waveform entries in the table can be placed in any order. Further, the entries do not need to be placed in either increasing code rate or increasing modulation order. What modulation orders to cover in the MCS table do not need to follow the example above.

Another possibility is to assume that for retransmission, the waveform remains the same as for the initial transmission. In such a design, the MCS table can be designed so that the last set of entries assumes the same waveform as the initial transmission. An example of this is given in Table 3. The table can also be designed such that DFT-S-OFDM waveform has denser or more MCS entries than OFDM waveform in the lower spectral efficiency range, while OFDM waveform has denser or more MCS entries than DFT-S-OFDM waveform in the higher spectral efficiency range. This is also illustrated in Table 3. As shown in Table 3, the MCS entries can be arranged with increasing spectral efficiencies and thus MCSs for the two different waveforms can be interlaced in the table.

TABLE 3

Example of Waveform Selection Using MCS Table

| MCS Index $I_{MCS}$ | Modulation order $Q_m$ | Code Rate R × 1024 | Waveform |
|---|---|---|---|
| 0 | 1 | 100 | DFT-S-OFDM |
| 1 | 1 | 150 | DFT-S-OFDM |
| 2 | 2 | 100 | DFT-S-OFDM |
| 3 | 2 | 120 | OFDM |
| 4 | 2 | 130.83 | DFT-S-OFDM |
| 5 | 2 | 160.83 | DFT-S-OFDM |
| 6 | 2 | 193 | OFDM |
| 7 | 2 | 209.17 | DFT-S-OFDM |
| 8 | 2 | 256.67 | DFT-S-OFDM |
| 9 | 2 | 308 | OFDM |
| 10 | 2 | 315.83 | DFT-S-OFDM |
| 11 | 2 | 374.17 | DFT-S-OFDM |
| 12 | 2 | 438.33 | DFT-S-OFDM |
| 13 | 2 | 449 | OFDM |
| 14 | 2 | 501.67 | DFT-S-OFDM |
| 15 | 2 | 565.83 | DFT-S-OFDM |
| 16 | 2 | 602 | OFDM |
| 17 | 2 | 630 | DFT-S-OFDM |
| 18 | 4 | 315 | DFT-S-OFDM |
| 19 | 4 | 361.67 | DFT-S-OFDM |
| 20 | 4 | 378 | OFDM |
| 21 | 4 | 408.33 | DFT-S-OFDM |
| 22 | 4 | 434 | OFDM |
| 23 | 4 | 460.83 | DFT-S-OFDM |
| 24 | 4 | 490 | OFDM |
| 25 | 4 | 513.33 | DFT-S-OFDM |
| 26 | 4 | 548.33 | DFT-S-OFDM |
| 27 | 4 | 553 | OFDM |
| 28 | 4 | 582.5 | DFT-S-OFDM |
| 29 | 4 | 616 | OFDM |
| 30 | 4 | 646.25 | DFT-S-OFDM |
| 31 | 4 | 658 | OFDM |
| 32 | 6 | 466 | OFDM |
| 33 | 4 | 708.75 | DFT-S-OFDM |
| 34 | 4 | 770 | DFT-S-OFDM |
| 35 | 6 | 513.33 | DFT-S-OFDM |
| 36 | 6 | 517 | OFDM |
| 37 | 6 | 555 | DFT-S-OFDM |
| 38 | 6 | 567 | OFDM |
| 39 | 6 | 599.17 | DFT-S-OFDM |
| 40 | 6 | 616 | OFDM |
| 41 | 6 | 643.33 | DFT-S-OFDM |
| 42 | 6 | 666 | OFDM |
| 43 | 6 | 685 | DFT-S-OFDM |
| 44 | 6 | 719 | OFDM |
| 45 | 6 | 727.5 | DFT-S-OFDM |
| 46 | 6 | 758.33 | DFT-S-OFDM |
| 47 | 6 | 772 | OFDM |
| 48 | 6 | 895.33 | DFT-S-OFDM |
| 49 | 6 | 822 | OFDM |
| 50 | 6 | 873 | OFDM |
| 51 | 8 | 682.5 | OFDM |
| 52 | 8 | 711 | OFDM |
| 53 | 8 | 754 | OFDM |
| 54 | 8 | 797 | OFDM |
| 55 | 8 | 841 | OFDM |
| 56 | 8 | 885 | OFDM |
| 57 | 8 | 916.5 | OFDM |
| 58 | 8 | 948 | OFDM |
| 59 | 1 | Reserved | reserved |

TABLE 3-continued

Example of Waveform Selection Using MCS Table

| MCS Index $I_{MCS}$ | Modulation order $Q_m$ | Code Rate R × 1024 | Waveform |
|---|---|---|---|
| 60 | 2 | | |
| 61 | 4 | | |
| 62 | 6 | | |
| 63 | 8 | | |

In a second embodiment, a more optimized MCS table may be provided without having multiple entries with modulation order and waveform selection. The procedure can be as follows. For an initial transmission the network node 14, such as a gNB, schedules, for example, MCS index I+1. This would select code rate R2 and modulation order of quadrature phase shift keying (QPSK) together with the waveform DFTS-OFDM. The network node seeks further in a retransmission to change the waveform to OFDM. The network node 14 can then select one of the entries I, I+2 and I+4. The WD 16 will then transmit with OFDM as the waveform and with the modulation order as given by the MCS table. Further, the WD 16 will not consider the code rate given by the table in this example.

TABLE 4

Example MCS Table for Changing Waveform

| MCS Index $I_{MCS}$ | Modulation order $Q_m$ | Code Rate R × 1024 | Waveform |
|---|---|---|---|
| I | 2 | R1 | OFDM |
| I + 1 | 2 | R2 | DFTS-OFDM |
| I + 2 | 4 | R3 | OFDM |
| I + 3 | 4 | R4 | DFTS-OFDM |
| I + 4 | 6 | R5 | OFDM |
| I + 5 | 6 | R6 | DFTS-OFDM |
| . . . | | | |
| 60 | 2 | reserved | reserved |
| 61 | 4 | | |
| 62 | 6 | | |
| 63 | 8 | | |

This embodiment can further be generalized without the aspect of waveform being addressed. Starting from the example in Table 5, a procedure can be as follows. For an initial transmission the network node 14 schedules, for example, MCS index I. This would select code rate R1 and modulation order of QPSK. The network node 14 further seeks a retransmission of the same TB but with a different modulation order. The network node 14 can then select one of out the entries I+1, I+2 and I+3. The WD 16 will then transmit a retransmission with the given new modulation order. Further the WD 16 will not consider the code rate given by the table in this example.

TABLE 5

Example MCS Table for Retransmissions

| MCS Index $I_{MCS}$ | Modulation order $Q_m$ | Code Rate R × 1024 |
|---|---|---|
| I | 2 | R1 |
| I + 1 | 4 | R2 |
| I + 2 | 6 | R3 |
| I + 3 | 8 | R4 |
| . . . | | |

In an alternative MCS table design, the MCS table is designed as in Table 1. However, the waveform selection is instead based on the resource allocation of the data. If the data is assigned consecutive resources of a radio base station (RBS) which are in the multiples of $2^i*3^j*5^k$, wherein i, j and k are a set of non-negative integers, then the waveform is DFTS-OFDM. Otherwise, the waveform is OFDM.

In another alternative, the waveform selection is based on the resource allocation scheme that is used so that if a resource allocation scheme like Type 2 in LTE DL or Type 0 in LTE UL is selected, the waveform is DFTS-OFDM. If the resource allocation is some other resource allocation scheme, the waveform is OFDM. The selection of resource allocation scheme may be based on the indication in the DCI message.

In one alternative, the resource allocation scheme (used by the WD 16 to determine the assigned resource blocks) is determined from the waveform selection determined from the DCI. For example, if the WD 16 determines DFTS-OFDM waveform is indicated by DCI (e.g. using the approach described in Embodiments 1 or 2), the WD 16 shall assume that a first type of resource allocation (e.g. Type 2 in LTE DL or Type 0 in LTE UL) is used for assigning RBs for UL transmission; and if the WD 16 determines that OFDM waveform is indicated by DCI, the WD 16 shall assume a second type of resource allocation (e.g. Type 0/1 in LTE DL or some other resource allocation) is used for assigning RBs for UL transmission. The WD 16 may also assume different length bit-fields for determining resource allocation based on whether OFDM or DFTS-OFDM is indicated in DCI.

In a fifth embodiment the waveform is selected together with TBS size so that if the TB size is smaller than a given threshold the waveform is DFTS-OFDM. An alternative is to combine this with some of the previous embodiments. If combined with first embodiment discussed above, if the TB size is smaller than a given threshold and for a given MCS index, the waveform is DFTS-OFDM. If however, the TB is larger than the threshold, the waveform is OFDM. If combined with second embodiment discussed above, the resource allocation limitation of (multiples of $2^i*3^j*5^k$) is only valid if the TB size is below a certain threshold, for which case DFTS-OFDM is selected as the waveform. If the TBS is above this threshold the waveform is OFDM.

In a sixth embodiment the waveform is selected based on the number of MIMO spatial layers, which is indicated as part of the downlink control information (DCI). In one non-limiting embodiment, DFT-S-OFDM waveform is selected if the number of MIMO spatial layers is one and OFDM waveform is selected if the number of MIMO spatial layers is more than one.

Some embodiments include a method in a network node 14 for uplink waveform selection. The method includes selecting a waveform based on one of a modulation and coding scheme, MCS, a resource allocation, and transport block size, TBS, and transmitting using the selected waveform.

In some embodiments, the selection of waveform includes selection of one of orthogonal frequency division multiplex, OFDM, and discrete Fourier transform spread-OFDM, DFTS-OFDM. In some embodiments, the method further includes signaling to a wireless device 16 the selection of waveform. In some embodiments, selecting a waveform includes choosing an index and a MCS from a table. In some embodiments, selecting a waveform includes choosing an index and a resource allocation from a table. In some embodiments, selecting a waveform includes choosing an index and a TBS from a table.

In some embodiments, a network node 14 for uplink waveform selection is provided. The network node 14 includes processing circuitry configured to select a waveform based on one of a modulation and coding scheme, MCS, a resource allocation, and transport block size, TBS, and transmit using the selected waveform.

In some embodiments, the selection of waveform includes selection of one of orthogonal frequency division multiplex, OFDM, and discrete Fourier transform spread-OFDM, DFTS-OFDM. In some embodiments, the processing circuitry is further configured to signal to a wireless device 16 the selection of waveform. In some embodiments, selecting a waveform includes choosing an index and a MCS from a table. In some embodiments, selecting a waveform includes choosing an index and a resource allocation from a table. In some embodiments, selecting a waveform includes choosing an index and a TBS from a table.

In some embodiments, a network node 14 for uplink waveform selection is provided. The network node 14 includes a waveform selection module configured to select a waveform based on one of a modulation and coding scheme, MCS, a resource allocation, and transport block size, TBS, and a transceiver module 35 configured to transmit using the selected waveform.

In some embodiments, a method in a wireless device 16 comprises receiving an indication of a selected waveform from a network node 14, and transmitting using the selected waveform. The method further includes determining a resource allocation based on the indicated selected waveform. In some embodiments, a wireless device 16 includes a waveform indication receiver configured to receive an indication of a selected waveform from a network node 14, and a transmitter configured to transmit using the selected waveform. The wireless device 16 further includes determining a resource allocation based on the indicated selected waveform. In some embodiments, a wireless device 16 includes a waveform indication receiver module configured to receive an indication of a selected waveform from a network node 14, and a transmitter module configured to transmit using the selected waveform.

According to one aspect, a wireless device 16 configured for waveform selection is provided. The wireless device 16 includes a receiver configured to receive a first indication of a first selected waveform from a network node. The wireless device 16 further includes a transmitter 50 configured to transmit using the first selected waveform.

In some embodiments, the first selected waveform is selected from a plurality of possible waveforms. In some embodiments, the receiver further receives a second indication of a second selected waveform, different from the first selected waveform, from the network node 14, the second selected waveform to be transmitted by the wireless device 16 to the network node 14. In some embodiments, the first selected waveform is one of an orthogonal frequency division multiplex, OFDM, waveform, a discrete Fourier transform spread-OFDM, DFTS-OFDM waveform and a single carrier modulation waveform. In some embodiments, the second selected waveform is one of an orthogonal frequency division multiplex, OFDM, waveform, a discrete Fourier transform spread-OFDM, DFTS-OFDM waveform and a single carrier modulation waveform. In some embodiments, the second indication of the second selected waveform is received on a downlink control channel and the second selected waveform is transmitted on an uplink shared channel. In some embodiments, the first indication of the first selected waveform is received on a downlink control channel and the first selected waveform is transmitted on an uplink shared channel. In some embodiments, the first indication of the first selected waveform indicates a modulation and coding scheme for the first selected waveform. In some embodiments, selecting the first selected waveform includes choosing an index and a modulation and coding scheme, MCS, from a table. In some embodiments, the first indication of the first selected waveform indicates a resource allocation for the first selected waveform. In some embodiments, waveform selection is based on resource allocation of data. In some embodiments, when consecutive resources are integer multiples of 2, 3 and 5, then a selected waveform is discrete Fourier transform orthogonal frequency division multiplex, DFTS-OFDM, and is OFDM otherwise. In some embodiments, selecting the waveform includes choosing an index and a resource allocation from a table. In some embodiments, the first indication of the first selected waveform indicates a transport block size, TBS, for the first selected waveform. In some embodiments, the first selected waveform is selected together with TBS so that if the TBS is smaller than a threshold, the first selected waveform is discrete Fourier transform orthogonal frequency division multiplex, DFTS-OFDM, and is OFDM otherwise.

According to another aspect, a method in a wireless device 16 for waveform selection is provided. The method includes receiving a first indication of a first selected waveform from a network node; and transmitting using the first selected waveform.

According to another aspect, a network node 14 configured for waveform selection is provided. The network node 14 includes a waveform selector configured to select at least a first selected waveform for a wireless device 16 to use for transmissions. The network node 14 further includes a transceiver 34 configured to transmit a first indication of the first selected waveform to inform the wireless device 16 of the selected first selected waveform.

In some embodiments, the first selected waveform is selected from a plurality of possible waveforms. In some embodiments, the waveform selector 18 is further configured to select a second selected waveform to use for transmissions to the wireless device 16 on a downlink. In some embodiments, the first selected waveform is one of an orthogonal frequency division multiplex, OFDM, waveform, a discrete Fourier transform spread-OFDM, DFTS-OFDM waveform and a single carrier modulation waveform. In some embodiments, the second selected waveform is one of an orthogonal frequency division multiplex, OFDM, waveform, a discrete Fourier transform spread-OFDM, DFTS-OFDM waveform and a single carrier modulation waveform. In some embodiments, the network node 14 is further configured to transmit a second indication of the second selected waveform to inform the wireless device 16 of the second selected waveform. In some embodiments, the second indication of the second selected waveform is transmitted on a downlink control channel and the second selected waveform is transmitted on a downlink shared channel. In some embodiments, the first indication of the first selected waveform is transmitted on a downlink control channel and the first selected waveform is transmitted on an uplink shared channel. In some embodiments, the first indication of the first selected waveform indicates a modulation and coding scheme for the first selected waveform. In some embodiments, selecting the first selected waveform includes choosing an index and a modulation and coding scheme, MCS, from a table. In some embodiments, the first indication of the first selected waveform indicates a resource allocation for the first selected waveform. In some embodiments, waveform selection is based on resource allocation of data. In some embodiments, when consecutive resources are integer multiples of 2, 3 and 5, then a selected waveform is discrete Fourier transform orthogonal frequency division multiplex, DFTS-OFDM, and is OFDM otherwise. In some embodiments, selecting the waveform includes choosing an index and a resource allocation from a table. In some embodiments, the first indication of the first selected waveform indicates a transport block size, TBS, for the first selected waveform. In some embodiments, the first selected waveform is selected together with TBS so that if the TBS is smaller than a threshold, the first selected waveform is discrete Fourier transform orthogonal frequency division multiplex, DFTS-OFDM, and is OFDM otherwise.

According to yet another aspect, a method in a network node 14 for waveform selection is provided. The method includes selecting at least a first waveform by for a wireless device 16 to use for transmissions. The method further includes transmitting a first indication of the first selected waveform to inform the wireless device 16 of the first selected waveform.

Some embodiments include:

Embodiment 1. A method in a network node for uplink waveform selection, the method comprising:
  selecting a waveform based on one of a modulation and coding scheme, MCS, a resource allocation, and transport block size, TBS; and
  transmitting using the selected waveform.

Embodiment 2. The method of Embodiment 1, wherein the selection of the waveform includes selection of one of orthogonal frequency division multiplex, OFDM, and discrete Fourier transform spread-OFDM, DFTS-OFDM.

Embodiment 3. The method of any of Embodiments 1 and 2, further comprising signaling to a wireless device the selection of the waveform.

Embodiment 4. The method of any of Embodiments 1-3, wherein selecting the waveform includes choosing an index and a MCS from a table.

Embodiment 5. The method of any of Embodiments 1-3, wherein selecting the waveform includes choosing an index and a resource allocation from a table.

Embodiment 6. The method of any of Embodiments 1-3, wherein selecting the waveform includes choosing an index and a TBS from a table.

Embodiment 7. A network node for uplink waveform selection, the network node comprising:
  processing circuitry configured to:
    select a waveform based on one of a modulation and coding scheme, MCS, a resource allocation, and transport block size, TBS; and
    transmit using the selected waveform.

Embodiment 8. The network node of Embodiment 7, wherein the selection of waveform includes selection of one of orthogonal frequency division multiplex, OFDM, and discrete Fourier transform spread-OFDM, DFTS-OFDM.

Embodiment 9. The network node of any of Embodiments 7 and 8, further comprising signaling to a wireless device the selection of waveform.

Embodiment 10. The network node of any of Embodiments 7-9, wherein selecting the waveform includes choosing an index and a MCS from a table.

Embodiment 11. The network node of any of Embodiments 7-9, wherein selecting the waveform includes choosing an index and a resource allocation from a table.

Embodiment 12. The network node of any of Embodiments 7-9, wherein selecting the waveform includes choosing an index and a TBS from a table.

Embodiment 13. A network node for uplink waveform selection, the network node comprising:
  a waveform selection module configured to select a waveform based on one of a modulation and coding scheme, MCS, a resource allocation, and transport block size, TBS; and
  a transceiver module configured to transmit using the selected waveform.

Embodiment 14. A method in a wireless device, the method comprising:
  receiving an indication of a selected waveform from a network node; and
  transmitting using the selected waveform.

Embodiment 15. The method of Embodiment 14, further comprising determining a resource allocation based on the indicated selected waveform.

Embodiment 16. The method of any of Embodiments 14 and 15, wherein the selection is based on one of a modulation and coding scheme, MCS, a resource allocation, and transport block size, TBS.

Embodiment 17. A wireless device, comprising:
  a waveform indication receiver configured to receive an indication of a selected waveform from a network node; and
  a transmitter configured to transmit using the selected waveform.

Embodiment 18. The wireless device of Embodiment 17, further comprising determining a resource allocation based on the indicated selected waveform.

Embodiment 19. The wireless device of any of Embodiments 17 and 18, wherein the selection is based on one of a modulation and coding scheme, MCS, a resource allocation, and transport block size, TBS.

Embodiment 20. A wireless device, comprising:
  a waveform indication receiver module configured to receive an indication of a selected waveform from a network node; and
  a transmitter module configured to transmit using the selected waveform.

| Abbreviation | Explanation |
| --- | --- |
| CDM | Code Division Multiplex |
| CQI | Channel Quality Information |
| CRC | Cyclic Redundancy Check |
| DCI | Downlink Control Information |
| DFT | Discrete Fourier Transform |
| DM-RS | Demodulation Reference Signal |
| FDM | Frequency Division Multiplex |
| HARQ | Hybrid Automatic Repeat Request |
| OFDM | Orthogonal Frequency Division Multiplex |
| PAPR | Peak to Average Power Ratio |
| PUCCH | Physical Uplink Control Channel |
| PRB | Physical Resource Block |
| RRC | Radio Resource Control |
| UCI | Uplink Control Information |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A wireless device configured for waveform selection, the wireless device comprising:
   a receiver configured to receive a first indication of a first selected waveform from a network node, the first indication of the first selected waveform indicating a modulation and coding scheme, MCS, for the first selected waveform, at least the first selected waveform being selected together with a transport block size, TBS:
   if the TBS is less than a predetermined threshold and for the indicated MCS, the first selected waveform is to be used by the wireless device for transmission;
   if the TBS is greater or equal to the predetermined threshold, a second selected waveform is to be used by the wireless device;
   one or both of the first selected waveform and the second selected waveform being selected from an MCS table, the MCS table including a plurality of modulation order values and a plurality of code rate values, each modulation order value that is unique corresponding to one of a first code rate value and a second code rate value of the plurality of code rate values, the first code rate value and the second code rate value being different, the first code rate value corresponding to the first selected waveform, the second code rate value corresponding to the second selected waveform; and
   a transmitter configured to transmit using one of the first selected waveform and the second selected waveform based at least on the first indication.

2. The wireless device of claim 1, wherein the first selected waveform is selected from a plurality of possible waveforms.

3. The wireless device of claim 1, wherein the receiver further receives, from the network node, a second indication of the second selected waveform, different from the first selected waveform, the second selected waveform to be transmitted by the wireless device to the network node further based on the second indication.

4. The wireless device of claim 3, wherein the second selected waveform is one of an orthogonal frequency division multiplex, OFDM, waveform, a discrete Fourier transform spread-OFDM, DFTS-OFDM waveform and a single carrier modulation waveform.

5. The wireless device of claim 3, wherein the second indication of the second selected waveform is received on a downlink control channel and the second selected waveform is transmitted on an uplink shared channel.

6. The wireless device of claim 1, wherein the first selected waveform is one of an orthogonal frequency division multiplex, OFDM, waveform, a discrete Fourier transform spread-OFDM, DFTS-OFDM waveform and a single carrier modulation waveform.

7. The wireless device of claim 1, wherein the first indication of the first selected waveform is received on a downlink control channel and the first selected waveform is transmitted on an uplink shared channel.

8. The wireless device of claim 7, wherein selecting one or both of the first waveform and the second waveform includes choosing an index and a resource allocation from the MCS table.

9. The wireless device of claim 1, wherein selecting the first selected waveform includes choosing an index and the MCS from the MCS table.

10. The wireless device of any claim 1, wherein the first indication of the first selected waveform indicates a resource allocation for the first selected waveform.

11. The wireless device of claim 10, wherein when consecutive resources are integer multiples of 2, 3 and 5, then a selected waveform is discrete Fourier transform orthogonal frequency division multiplex, DFTS-OFDM, and is OFDM otherwise.

12. The wireless device of claim 1, wherein waveform selection of one or both of the first waveform and the second waveform is based on resource allocation of data.

13. The wireless device of claim 1, wherein the first indication of the first selected waveform indicates the TBS for the first selected waveform.

14. The wireless device of claim 13, wherein if the TBS is less than the predetermined threshold, the first selected waveform is discrete Fourier transform orthogonal frequency division multiplex, DFTS-OFDM, and is OFDM otherwise.

15. A method in a wireless device for waveform selection, the method comprising:
  receiving a first indication of a first selected waveform from a network node, the first indication of the first selected waveform indicating a modulation and coding scheme, MCS, for the first selected waveform, at least the first selected waveform being selected together with a transport block size, TBS:
    if the TBS is less than a predetermined threshold and for the indicated MCS, the first selected waveform is to be used by the wireless device for transmission;
    if the TBS is greater or equal to the predetermined threshold, a second selected waveform is to be used by the wireless device;
  one or both of the first selected waveform and the second selected waveform being selected from an MCS table, the MCS table including a plurality of modulation order values and a plurality of code rate values, each modulation order value that is unique corresponding to one of a first code rate value and a second code rate value of the plurality of code rate values, the first code rate value and the second code rate value being different, the first code rate value corresponding to the first selected waveform, the second code rate value corresponding to the second selected waveform; and
  transmitting using one of the first selected waveform and the second selected waveform based at least on the received first indication.

16. A network node configured for waveform selection, the network node comprising:
  a waveform selector configured to select at least a first selected waveform, associated with a first indication, for a wireless device to use for transmissions, the first indication of the first selected waveform indicating a modulation and coding scheme, MCS, for the first selected waveform, at least the first selected waveform being selected together with a transport block size, TBS:
    if the TBS is less than a predetermined threshold and for the indicated MCS, the first selected waveform is to be used by the wireless device for transmission;
    if the TBS is greater or equal to the predetermined threshold, a second selected waveform is to be used by the wireless device;
  one or both of the first selected waveform and the second selected waveform being selected from an MCS table, the MCS table including a plurality of modulation order values and a plurality of code rate values, each modulation order value that is unique corresponding to one of a first code rate value and a second code rate value of the plurality of code rate values, the first code rate value and the second code rate value being different, the first code rate value corresponding to the first selected waveform, the second code rate value corresponding to the second selected waveform; and
  a transmitter configured to transmit the first indication of the first selected waveform to inform the wireless device of the selected first selected waveform and trigger the wireless device to transmit using one of the first selected waveform and the second selected waveform based at least on the first indication.

* * * * *